United States Patent
Wheeler

(10) Patent No.: US 8,256,884 B2
(45) Date of Patent: Sep. 4, 2012

(54) INK JET INK AND INK SET

(75) Inventor: James Walter Wheeler, West Chester, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 701 days.

(21) Appl. No.: 12/416,370

(22) Filed: Apr. 1, 2009

(65) Prior Publication Data

US 2010/0255201 A1    Oct. 7, 2010

(51) Int. Cl.
*G01D 11/00* (2006.01)
(52) U.S. Cl. ........ 347/100; 347/95; 106/31.27; 523/160
(58) Field of Classification Search .......... 347/100, 347/95, 96, 101, 102; 106/31.6, 31.13, 31.27; 523/160, 161
See application file for complete search history.

(56) References Cited

U.S. PATENT DOCUMENTS

| | | | | |
|---|---|---|---|---|
| 4,957,553 | A * | 9/1990 | Koike et al. | 347/100 |
| 5,852,075 | A * | 12/1998 | Held | 347/100 |
| 6,660,072 | B2 | 12/2003 | Chatterjee | |
| 6,726,757 | B2 | 4/2004 | Sarkisian et al. | |
| 6,808,556 | B2 | 10/2004 | Kelly-Rowley et al. | |
| 6,818,048 | B2 | 11/2004 | Prasad et al. | |
| 7,144,676 | B2 * | 12/2006 | Barr et al. | 430/270.1 |
| 2003/0101905 | A1 * | 6/2003 | Momose | 106/31.58 |
| 2004/0249018 | A1 | 12/2004 | Kataoka et al. | |
| 2005/0003112 | A1 | 1/2005 | Chen | |
| 2007/0062413 | A1 * | 3/2007 | Matsumoto et al. | 106/31.47 |
| 2007/0171266 | A1 * | 7/2007 | Kluge et al. | 347/100 |
| 2007/0283845 | A1 * | 12/2007 | Mizusaki et al. | 106/31.58 |

FOREIGN PATENT DOCUMENTS

| | | |
|---|---|---|
| EP | 1586612 | 6/2008 |
| JP | 2003320659 | 11/2003 |

* cited by examiner

*Primary Examiner* — Manish S Shah
(74) *Attorney, Agent, or Firm* — John H. Lamming; Simon L. Xu

(57) ABSTRACT

The present disclosure provides an ink jet ink including a dye, a vehicle, and a surfactant combination having: (a) an acetylene alcohol having the generic structure:

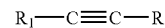

wherein R and $R_1$ are C1-C10 linear or branched alkyl groups or hydrogen, and wherein only one hydrogen on either R or $R_1$ is replaced by a hydroxy group; and
(b) a siloxane surfactant having the generalized structure

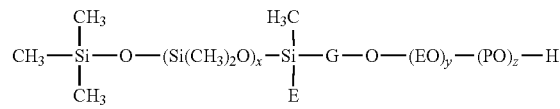

wherein E is —$CH_3$ or —O—$Si(CH_3)_3$, provided that E is —$CH_3$ when x is greater than 0; EO is ethylene oxide, PO is propylene oxide, G=-$CH_2$—, or —$CH_2$—$CH_2$—$CH_2$—, x, y, and z are independently about 0 to about 40, and wherein the acetylene alcohol is present in the amount of at least about 0.3%, and the siloxane surfactant is present in the amount of at least about 0.03 to about 0.5 percent, based on the weight of the ink composition. The inks provide good color on a range of media and can be loaded into used inkjet pens without volume reduction.

25 Claims, 1 Drawing Sheet

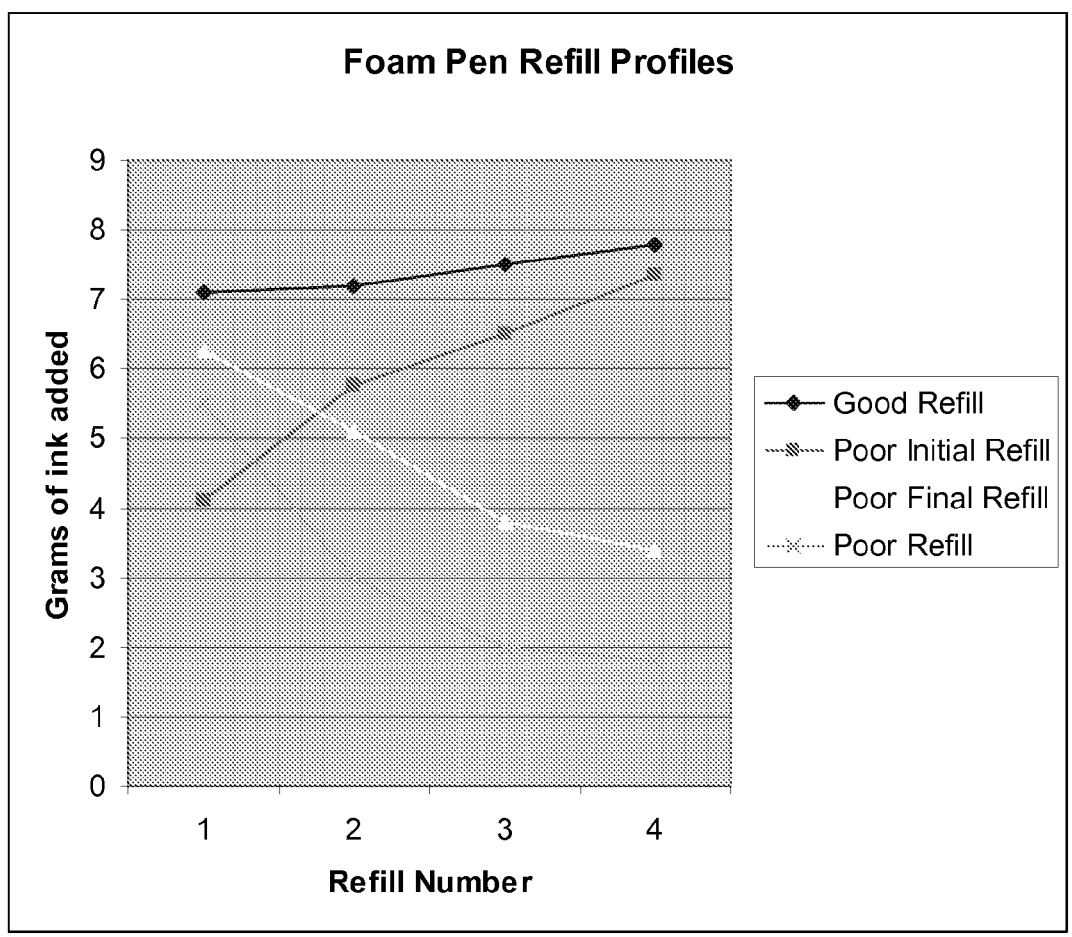

INK JET INK AND INK SET

BACKGROUND OF THE DISCLOSURE

The present disclosure relates to aqueous dye based ink jet inks. The present disclosure further relates to aqueous dye based ink jet inks for use with specialty papers such as photo glossy papers.

Ink jet printing is a non-impact printing process in which droplets of ink are deposited on a substrate, such as paper, to form the desired image. The droplets are ejected from a print head in response to electrical signals generated by a microprocessor. Ink jet printers offer low cost, high quality printing and have become a popular alternative to other types of printers.

An ink jet ink set for color printing will generally comprise cyan, magenta and yellow (CMY) inks, which are referred to as the primary colors. An ink set will also commonly comprise a black ink (CMYK).

A suitable ink should generally exhibit good crusting resistance, good stability, proper viscosity, proper surface tension, good color-to-color bleed alleviation, rapid dry time, consumer-safety and low strike-through.

In addition, the ink set should provide printed images having good color characteristics, such as correct hue and high chroma. Preferably, the ink set will achieve these favorable characteristics on a range of media including plain paper as well as specialty media such as transparency film and coated paper. Also, preferably, the hard copy output is reasonably lightfast.

While some of these conditions may be met by ink vehicle design, other conditions must be met by the proper selection and combination of the colorants.

When inks are to be used with photo glossy papers, it is preferred that the ink set typically not comprise a black pigmented ink because the black pigmented inks have a tendency to sit on the surface of the photo glossy paper and this is disadvantageous because the gloss may be reduced and the pigment black may easily rub off the media.

A black image is typically generated using a dye-based cyan, magenta, yellow containing ink set and mixing the three colors together (also known as a CMY composite black). Because of variable dye migration into the media, the color balance between the cyan, magenta, yellow inks to give a black image is lost, and, oftentimes, a bluish image or so-called blue haze (typically resulting from loss of yellow color) is formed instead of a black image.

The ink jet cartridges also have a useful life after the ink is consumed. It is desirable to be able to refill the cartridges multiple times to make best use of the resources. However, once ink has been introduced into a foam filled cartridge, it has been difficult to refill the cartridge with ink a second time. This may be caused by air trapped in the foam that the second charge of ink cannot displace. One option is to disassemble the cartridge and replace the used foam with new, dry foam. However, this requires special equipment to correctly compress the new foam and position it in the cartridge.

A need still exists for improved inks and ink sets that provide appropriate color, light fastness and bleed control, particularly on plain paper and specialty papers such as photo glossy paper. There also exists a need for inks that will fill a previously wetted foam pen multiple times.

SUMMARY OF THE DISCLOSURE

In a first aspect, this disclosure provides an ink jet ink comprising a dye, an aqueous vehicle, and a surfactant combination comprising:

(a) an acetylene alcohol comprising at least one compound having the generic structure:

wherein R and $R_1$ are C1-C10 linear or branched alkyl groups or hydrogen, and wherein only one hydrogen on either R or $R_1$ is replaced by a hydroxy group; and (b) a siloxane surfactant comprising at least one compound having the generalized structure

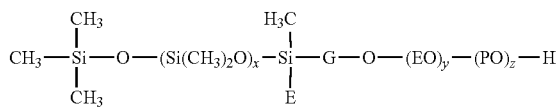

wherein E is $-CH_3$ or $-O-Si(CH_3)_3$, $G=-CH_2-$, or $-CH_2-CH_2-CH_2-$, x, y, and z are independently about 0 to about 40, more typically 0 to about 20, still more typically about 1 to about 10, most typically about 3 to about 8, and y+z is at least 1; and wherein the acetylene alcohol is present in the amount of at least about 0.3%, and the siloxane surfactant is present in the amount of at least about 0.03 to about 0.5 percent, based on the weight of the ink composition.

In a second aspect, the disclosure provides an ink set wherein at least one ink in the ink set comprises a dye, a vehicle, and a surfactant combination comprising:

(a) an acetylene alcohol comprising at least one compound having the generic structure:

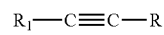

wherein R and $R_1$ are C1-C10 linear or branched alkyl groups or hydrogen, and wherein only one hydrogen on either R or $R_1$ is replaced by a hydroxy group; and (b) a siloxane surfactant comprising at least one compound having the generalized structure

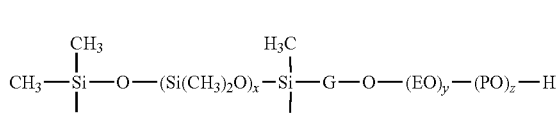

wherein E is $-CH_3$ or $-O-Si(CH_3)_3$, $G=-CH_2-$, or $-CH_2-CH_2-CH_2-$, x, y, and z are independently about 0 to about 40, more typically 0 to about 20, still more typically about 1 to about 10, most typically about 3 to about 8, and y+z is at least 1; and wherein the acetylene alcohol is present in the amount of at least about 0.3%, and the siloxane surfactant is present in the amount of at least about 0.03 to about 0.5 percent, based on the weight of the ink composition.

In a third aspect, the disclosure provides a printer comprising an ink set wherein at least one ink in the ink set comprises a dye, a vehicle, and an a surfactant combination comprising:

(a) an acetylene alcohol comprising at least one compound having the generic structure:

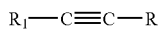

wherein R and $R_1$ are C1-C10 linear or branched alkyl groups or hydrogen, and wherein only one hydrogen on either R or $R_1$ is replaced by a hydroxy group; and (b) a siloxane surfactant comprising at least one compound having the generalized structure

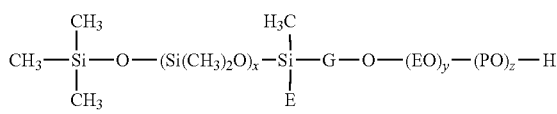

wherein E is —$CH_3$ or —O—$Si(CH_3)_3$,
G=-$CH_2$—, or —$CH_2$—$CH_2$—$CH_2$—,
x, y, and z are independently about 0 to about 40, more typically 0 to about 20, still more typically about 1 to about 10, most typically about 3 to about 8, and
y+z is at least 1; and
wherein the acetylene alcohol is present in the amount of at least about 0.3%, and the siloxane surfactant is present in the amount of at least about 0.03 to about 0.5 percent, based on the weight of the ink composition.

In a fourth aspect, the present disclosure provides a method for printing a substrate comprising the steps of:

(a) providing an ink jet printer that is responsive to digital data signals;

(b) loading the printer with the substrate to be printed;

(c) loading the printer with at least one ink jet ink or ink jet set containing the at least one ink; and (d) printing onto the substrate using the at least one ink jet ink or ink jet set in response to the digital data signals, wherein the at least one ink comprises a dye, a vehicle, and an a surfactant combination comprising:

(a) an acetylene alcohol comprising at least one compound having the generic structure:

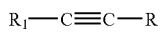

wherein R and $R_1$ are C1-C10 linear or branched alkyl groups or hydrogen, and wherein only one hydrogen on either R or $R_1$ is replaced by a hydroxy group; and (b) a siloxane surfactant comprising at least one compound having the generalized structure

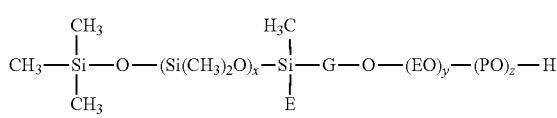

wherein E is —$CH_3$ or —O—$Si(CH_3)_3$,
G=-$CH_2$—, or —$CH_2$—$CH_2$—$CH_2$—,
x, y, and z are independently about 0 to about 40, more typically 0 to about 20, still more typically about 1 to about 10, most typically about 3 to about 8, and
y+z is at least 1; and
wherein the acetylene alcohol is present in the amount of at least about 0.3%, and the siloxane surfactant is present in the amount of at least about 0.03 to about 0.5 percent, based on the weight of the ink composition.

Typical substrates include plain paper and photo glossy paper.

These and other features and advantages of the present disclosure will be more readily understood by those of ordinary skill in the art from a reading of the following detailed description. It is to be appreciated that certain features of the disclosure which are, for clarity, described above and below in the context of separate embodiments, may also be provided in combination in a single embodiment. Conversely, various features of the disclosure that are, for brevity, described in the context of a single embodiment, may also be provided separately or in any subcombination. In addition, references in the singular may also include the plural (for example, "a" and "an" may refer to one, or one or more) unless the context specifically states otherwise. Further, values stated in ranges include each and every value within that range.

BRIEF DESCRIPTION OF THE DRAWINGS

FIG. 1 shows foam pen refill profiles.

DETAILED DESCRIPTION OF THE PREFERRED EMBODIMENTS

Ink jet inks that are particularly useful for printing paper substrates, in particular photo glossy papers comprise a dye, a vehicle, and a surfactant combination.

Surfactant Combination

The surfactant combination comprises an acetylene alcohol and a siloxane surfactant.

The acetylene alcohol has the generic structure:

wherein R and $R_1$ are C1-C10 linear or branched alkyl groups or hydrogen, and wherein only one hydrogen on either R or $R_1$ is replaced by a hydroxy group. Linear alkyl groups are selected from the group consisting of methyl, ethyl, propyl, butyl, pentyl, hexyl, heptyl, octyl, nonyl, etc., and branched alkyl groups are selected from the group consisting of isopropyl, isobutyl, isopentyl, and other branched structures such that the total molecular weight does not exceed 182. The molecular weight may be typically about 56 to about 182, more typically 84 to about 140.

Some typical structures include:

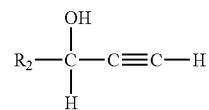

wherein $R_2$ is $C_2$ to $C_9$ linear or branched alkyl,

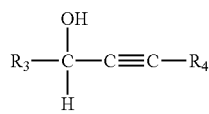

wherein $R_3$ and $R_4$ are linear or branched alkyl with 2 to 9 total carbons,

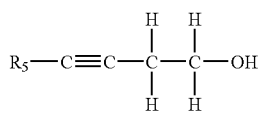

wherein $R_5$ is $C_1$ to $C_8$ linear or branched alkyl,

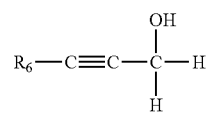

wherein $R_6$ is a linear or branched alkyl containing a total of 2 to 9 carbons Some examples of acetylene alcohols having the following structures include 3,4-diethyl-1-hexyn-3-ol, 3-nonyl-1-ol, 3,5,5-trimethyl-1-hexyn-3-ol, 3,4,4-trimethyl-1-hexyn-3-ol, 3,5-dimethyl-1-heptyn-3-ol, 4,6-dimethyl-2-heptyn-4-ol, 1-octyn-3-ol, 3-octyn-1-ol, 2-octyn-1-ol, 3-ethyl-1-hexyn-3-ol, 3,4-dimethyl-1-hexyn-3-ol, 3,5-dimethyl-1-hexyn-3-ol, 3-methyl-4-heptyn-3-ol, 2-methyl-3-hexyn-2-ol, 5-methyl-1-hexyn-3-ol, 3-methyl-1-pentyn-3-ol, 2-methyl-3-pentyn-2-ol, 2-methyl-3-butyn-2-ol, 2-pentyn-1-ol, 1-pentyn-3-ol. A suitable acetylene alcohol is sold under the trade name, Surfynol® 61 manufactured by Air Products and Chemicals, Inc. Allentown, Pa. Typically, the acetylene alcohol may be present in the amount of at least about 0.3%, more typically about 0.3 to about 1.5%, based on the weight of the ink composition. These amounts may be higher depending on the molecular weight of the acetylene alcohol.

The siloxane surfactant having the generalized structure

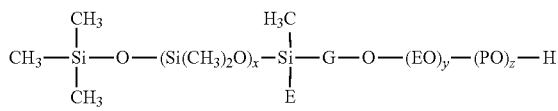

wherein E is —$CH_3$ or —O—$Si(CH_3)_3$,
G=-$CH_2$—, or —$CH_2$—$CH_2$—$CH_2$—,
x, y, and z are independently about 0 to about 40, more typically 0 to about 20, still more typically about 1 to about 10, most typically about 3 to about 8, and
y+z is at least 1.

Some examples of trisiloxane surfactants include Byk 347, available from Byk Chemie, Wallingford Conn., and Silwet® surfactants, such as Silwet® L-7550, available from Momentive Performance Materials, Friendly, W. Va. The trisiloxane surfactant may be present in the amount of at least about 0.03 to about 0.5 percent, more typically about 0.05 to about 0.3 percent, based on the weight of the ink composition.

Some typical siloxane surfactants include:
Ethanol, 2-[[1,3,3,3-tetramethyl-1-[(trimethylsilyl)oxy]disiloxanyl]methoxy]-ethanol and ethoxylated derivatives thereof with a molecular weight of about 500 having the structure:

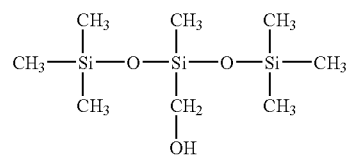

[3[1,3,3,3-tetramethyl-1-[(trimethylsilyl)oxy]-1-disiloxanyl]propyl]ether and polyethers with propylene glycol to give a molecular weight of about 400 having the structure:

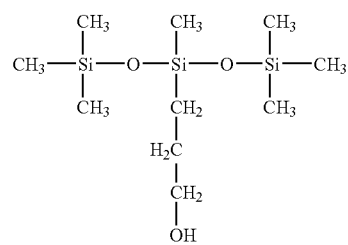

Other useful siloxane surfactants have the structure:

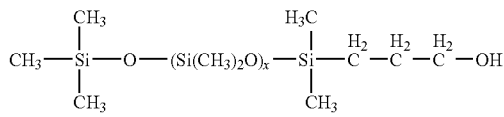

Also useful are these structures comprising polyethers with ethylene glycol wherein x and the amount of ethylene glycol may be adjusted to give a molecular weight of about 1,700 to about 2,000. Alternately the structure shown comprising polyethers with propylene oxide and x adjusted to give a molecular weight of about 2,800 may also be useful.

Also typical is the structure shown below and said structure comprising polyethers with propylene glycol wherein x and the amount of propylene glycol may be adjusted to give a molecular weight of about 3,000 and the terminal hydroxy group is capped with a butyl group. Alternately the structure shown below comprising polyethers with ethylene oxide are also useful wherein x and the amount of ethylene oxide may be adjusted to give a molecular weight about 3,000 and the terminal hydroxy group is capped with a methyl group.

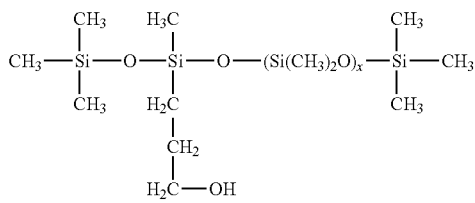

Vehicle

The aqueous vehicle of each ink is selected independently and may be the same as or different from the aqueous vehicle of any other ink in the set.

The ink vehicle is the carrier (or medium) for the colorant. An "aqueous vehicle" refers to a vehicle comprised of water or a mixture of water and at least one water-soluble organic solvent (co-solvent) or humectant. Selection of a suitable mixture depends on requirements of the specific application, such as desired surface tension and viscosity, the selected colorant, and compatibility with substrate onto which the ink will be printed.

Examples of water-soluble organic solvents and humectants include: alcohols, ketones, keto-alcohols, ethers and others, such as thiodiglycol, Sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

The amount of vehicle in an ink is typically in the range of from about 60% to about 99.8%, and more typically from about 80% to about 99%. An aqueous vehicle will typically contain about 30% to about 95% water with the balance (i.e., about 70% to about 5%) being the water-soluble solvent. Ink compositions typically contain about 60% to about 95% water, based on the total weight of the aqueous vehicle.

Dyes

The dyes useful in this disclosure may be acid, direct, reactive or food dyes. Some suitable direct dyes include C.I. Direct Black 2, 4, 9, 11, 14, 17, 19, 22, 27, 32, 36, 38, 41, 48, 49, 51, 56, 62, 71, 74, 75, 77, 78, 80, 91, 105, 106, 107, 108, 112, 113, 17, 122, 132, 146, 151, 154 and 194; C.I. Direct Blue 1, 2, 6, 8, 10, 14, 15, 22, 25, 34, 69, 70, 71, 72, 75, 76, 78, 80, 81, 82, 83, 86, 90, 95, 98, 106, 108, 110, 120, 123, 158, 159, 163, 165, 192, 193, 194, 195, 196, 199, 200, 201, 202, 203, 207, 218, 236, 237, 239, 246 and 258; C.I. Direct Brown IA, 2, 6, 25, 27, 31, 44, 52, 58, 95, 100, 101, 106, 112, 173, 194, 195, 209, 210, 211 and 222; C.I. Direct Green 1, 6, 8, 26, 28, 33, 37, 59, 63 and 64; C.I. Direct Orange 6, 8, 10, 26, 29, 32, 39, 40, 41, 46, 49, 51 and 102; C.I. Direct Red 1, 2, 4, 8, 9, 11, 13, 17, 20, 23, 24, 26, 28, 31, 33, 37, 39, 44, 46, 47, 48, 51, 54, 59, 62, 72, 75, 76, 79, 80, 81, 83, 90, 99, 101, 111, 113, 145, 189, 220, 225, 230 and 234; C.I. Direct Violet 1, 7, 9, 12, 35, 47, 51, 66, 90 and 94 and direct yellow 11, 22, 24, 26, 27, 29, 33, 34, 39, 41, 58, 85, 86, 87, 88, 98, 100, 106, 110, 132, and 169.

Some suitable Acid dyes include C.I Acid Black 2, 7, 16, 17, 21, 24, 26, 28, 31, 41, 48, 52, 56, 58, 60, 63, 84, 94, 107, 109, 112, 118, 119, 121, 122, 123, 131, 155, 156, 172, 194 and 208; C.I. Acid Blue 1, 7, 9, 15, 22, 23, 25, 27, 29, 40, 41, 43, 45, 47, 49, 51, 53, 55, 56, 59, 62, 69, 74, 77, 78, 83, 90, 91, 92, 93, 102, 104, 111, 113, 117, 120, 124, 126, 145, 158, 161, 167, 171, 175, 183, 185, 193, 229, 234, 236 and 254; C.I. Acid Brown 4, 6, 8, 14, 17, 20, 102 and 105; C.I. Acid Green 3, 5, 9, 12, 16, 19, 20, 25, 27, 35, 41 and 95; C.I. Acid Orange 1, 2, 7, 8, 10, 14, 19, 20, 24, 28, 33, 51, 52, 56, 61, 63, 64, 67, 74, 92, 95, 125, 127 and 156; C.I. Acid Red 1, 2, 4, 666, 8, 13, 14, 15, 18, 19, 21, 26, 27, 30, 32, 33, 34, 35, 37, 38, 40, 42, 45, 51, 52, 54, 57, 73, 80, 82, 83, 85, 87, 88, 89, 92, 94, 97, 99, 101, 106, 108, 110, 111, 114, 119, 128, 129, 131, 134, 135, 138, 145, 151, 154, 155, 161, 172, 176, 179, 180, 183, 184, 186, 187, 214, 243, 248, 249, 254, 256, 257, 266, 270, 288, 289, 296, 317, 318, 337 and 351; C.I. Acid Violet 1, 7, 9, 11, 15, 17, 34, 35, 41, 43, 49, 56, 58 and 75; and C.I. Acid Yellow 1, 3, 4, 7, 9, 11, 12, 13, 14, 17, 18, 19, 23, 25, 29, 34, 36, 38, 40, 41, 42, 44, 49, 53, 55, 56, 59, 61, 62, 65, 71, 72, 73, 76, 78, 79, 99, 111, 114, 116, 118, 121, 122, 129, 135, 161, 162, 171, 172, 183, 199 and 201.

Some Basic dyes include C.I. Basic Black 2 and 8; C.I. Basic Blue 1, 3, 5, 7, 9, 24, 25, 26, 28 and 29; C.I. Basic Brown 1 and 12; C.I. Basic Green 1 and 4; C.I. Basic Orange 2, 15, 21 and 22; C.I. Basic Red 1, 2, 9, 12, 13 and 37; C.I. Basic Violet 1, 3, 5, 7, 9, 24, 25, 26, 28 and 29; and C.I. Basic Yellow 1, 2, 11, 12, 14, 21, 32 and 36.

Some Reactive Dyes include C.I. Reactive Black 1, 3, 5, 6, 8, 12 and 14; C.I. Reactive Blue 2, 5, 7, 12, 13, 14, 15, 17, 18, 19, 20, 21, 25, 27, 28, 37, 38, 40, 41 and 71; C.I. Reactive Brown 1, 7 and 16; C.I. Reactive Green 5 and 7; C.I. Reactive Orange 2, 5, 7, 16, 20 and 24; C.I. Reactive Red 6, 7, 11, 12, 15, 17, 21, 23, 24, 35, 36, 42, 63, 66, and 180; C.I. Reactive Violet 2, 4, 5, 8 and 9; and C.I. Reactive Yellow 1, 2, 3, 13, 14, 15 and 17.

Some Dyes for food include C.I. Food Black 2; C.I. Food Blue 3, 4 and 5; C.I. Food Green 2 and 3; C.I. Food Red 2, 3, 7, 9, 14, 52, 87, 92, 94, 102, 104, 105 and 106; C.I. Food Violet 2; and C.I. Food Yellow 3, 4 and 5.

Examples of typical dyes include C.I. Acid Black 1, 21, 24, 26, 41, 48, 52, 60, 63, 84, 94, 123, and 194; C.I. Acid Blue 1, 7, 9, 15, 25, 27, 43, 45, 47, 59, 62, 69, 77, 78, 83, 90, 92, 102, 104, 113, 120, 158, 161 and 193; C.I. Acid Brown 6, 8, 14, 17, 20, 102 and 105; C.I. Acid Green 3, 5, 9, 12, 19, 20, 25, 35 and 95; C.I. Acid Orange 1, 6, 7, 8, 10, 14, 19, 20, 24, 28, 33, 51, 52, 61, 63, 67, 74, 92, 125, 127 and 156; C.I. Acid Red 1, 2, 13, 14, 18, 27, 32, 33, 35, 37, 42, 52, 73, 85, 87, 88, 89, 97, 99, 101, 106, 111, 114, 128, 134, 138, 145, 151, 154, 161, 179, 180, 183, 186, 214, 248, 249, 266, 288, 289, 296, 337 and 351; C.I. Acid Violet 1, 7, 9, 17, 56 and 58; C.I. Acid Yellow 7, 9, 11, 17, 19, 23, 25, 29, 36, 38, 40, 42, 44, 49, 56, 59, 62, 65, 72, 76, 99, 118, 121, 129, 135, 161, 162, 171, 183, 199 and 201; C.I. Direct Black 4, 17, 19, 22, 32, 38, 80, 91, 122 and 154; C.I. Direct Blue 1, 2, 6, 10, 14, 15, 22, 25, 71, 76, 78, 80, 95, 98, 159, 199, and 218; C.I. Direct Brown 2, 27, 31, 52, 95, 100 and 222; C.I. Direct Green 1, 6, 26, 28, 33 and 59; C.I. Direct Orange 6, 26, 29, 32, 39, 40, 46 and 102; C.I. Direct Red 2, 4, 23, 24, 26, 31, 37, 39, 54, 62, 75, 76, 79, 80, 81, 83, 99, 111, 113, 220 and 234; C.I. Direct Violet 7, 9, 35, 47, 48, 51 and 66; and C.I. Direct Yellow 4, 8, 11, 12, 22, 26, 27, 29, 33, 44, 50, 106, 132, and 169. C.I. Reactive Black 5, 8 and 31, C.I. Reactive Blue 19, 21, 71, 160, 163, 171, 198, and 269, C.I. Reactive Red 21, 23, 120, 141, 180, 194, and 195; C.I. Reactive Yellow 15, 84, 86, 135, 145, 160, 168, and 205. Also preferred is a dye with a CAS number of 182061-89-8, known as Ilford Magenta M377.

Dye-based inks of the present disclosure typically have a colorant (dye) content from about 0.1 wt % to about 10 wt %, more typically about 0.1 wt % to about 8 wt % and, most typically, from about 0.5 wt % to about 6 wt %, based on the total weight of the ink. The "dye content" in a given ink refers the total dye present in that ink, whether a single dye species or a combination of two or more dye species.

The dyes are usually in their salt form, such as an alkali metal (Na, K, or Li) or quaternary ammonium salt. Most commonly, the commercially available salt form is sodium. Other salt forms can be made using well-known techniques.

Metal Salt

A metal salt may be incorporated in an ink formulation to help control bleed, and may provide other benefits as well. Use of metal salts in this way has been described, for example, U.S. Pat. Nos. 5,488,402 and 5,518,534 incorporated herein by reference.

Additives

Other ingredients (additives) may be formulated into the ink jet ink to the extent that such other ingredients do not interfere with the stability and jetting-ability of the finished ink, which may be readily determined by routine experimentation. Such other ingredients are in a general sense well known in the art.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms. Buffers may be used to maintain pH. Buffers include, for example, tris(hydroxymethyl)-aminomethane ("Trizma" or "Tris").

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Additives, when present, generally comprise less than about 15% by weight, based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic. Preferred pH for the ink is in the range of from about 6.5 to about 8.

Ink Jet Ink Set

The surfactant combination of the present disclosure is advantageously used in at least one dye-based colored ink, such as a yellow, magenta or a cyan dye-based ink, in an ink set, more typically in the yellow dye-based ink of the ink set. The inks have similar beneficial attributes such as chroma, light fastness and tolerance to bleed control agents. Some suitable dyes for use in this disclosure include anionic dyes typically having sulfonate and carboxylate groups and cationic dyes typically having polymethine and arylcarbonium groups. Reactive dyes may also be used. Some useful dyes are disclosed in U.S. Pat. Nos. 5,098,475 and 6,053,969 incorporated herein by reference.

Ink sets may further comprise one or more "gamut-expanding" inks, including different colored inks such as an orange ink, a green ink, a red ink and/or a blue ink, and combinations of full strength and light strengths inks such as light cyan and light magenta.

The other dye-based inks in the set preferably comprise an aqueous vehicle in which the colorant is soluble, with gamut expanding colors such as Red, Blue, or Green. The aqueous vehicle, optional other components and ink properties are similar to, but selected independently of, the Cyan, Magenta, and Yellow inks as described above.

The inks of the present disclosure may be used in an ink set that further includes a pigmented black ink, although it is preferred for printing photo glossy papers that black be generated using a combination of the cyan, magenta and yellow dye based inks. When a pigmented black ink is used, it is especially advantageous for the dye-based ink(s) to comprise bleed control agents, such as metal salts, and for the pigment in the black ink to be an anionically-stabilized pigment dispersion that will "crash" or be immobilized on contact with the metal salts in the dye-based colored inks and thereby resist bleeding into the colored areas of a printed image.

Typical aqueous anionic pigment black ink comprise an aqueous vehicle and optionally ingredients (additives) as described above, and black pigment that is stably dispersed in the aqueous vehicle by well known techniques. The black pigment is preferably carbon black.

Sources of colorants used in ink jet inks are generally well known to those skilled in the art.

Method of Printing

The method of printing prescribed herein can be accomplished with any suitable ink jet printer. The printer may be thermal or piezoelectric. Some useful printers are those manufactured by Hewlett-Packard, Canon, Lexmark and Epson. The substrate can be any suitable substrate, but the instant disclosure is particularly useful for printing on paper, and in particular specialty paper such as photo glossy paper.

The disclosure provides a method for printing a substrate comprising the steps of:

(a) providing an ink jet printer that is responsive to digital data signals;

(b) loading the printer with a substrate to be printed;

(c) loading the printer with at least one ink jet ink or an ink jet set comprising the at least one ink; and (d) printing onto the substrate using the at least one ink jet ink or ink jet set in response to the digital data signals, wherein the at least one ink comprises a dye, a vehicle, and an a surfactant combination comprising:

(a) an acetylene alcohol comprising at least one compound having the generic structure:

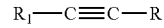

wherein R and $R_1$ are C1-C10 linear or branched alkyl groups or hydrogen, and wherein only one hydrogen on either R or $R_1$ is replaced by a hydroxy group; and (b) a siloxane surfactant comprising at least one compound having the generalized structure

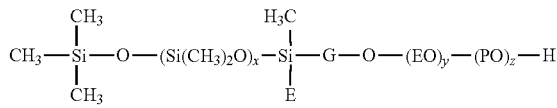

wherein E is $-CH_3$ or $-O-Si(CH_3)_3$, $G=-CH_2-$, or $-CH_2-CH_2-CH_2-$, x, y, and z are independently about 0 to about 40, more typically 0 to about 20, still more typically about 1 to about 10, most typically about 3 to about 8, and y+z is at least 1; and wherein the acetylene alcohol is present in the amount of at least about 0.3%, and the siloxane surfactant is present in the amount of at least about 0.03 to about 0.3 percent, based on the weight of the ink composition. In a preferred embodiment, the above printing method employs at least a multi-color CMY ink set and the method is used to form a CMY composite black image with little or no blue haze.

It is desirable to be able to refill the cartridges multiple times to make best use of the resources. However, once ink has been introduced into a foam filled cartridge, it has been difficult to refill the cartridge with ink a second time. This may be caused by air trapped in the foam that the second charge of ink can not displace. FIG. 1 shows four types of refill characteristics. The first shows good refill. The ink used can be loaded into the cartridge to amount equal to or greater than the amount of ink jet ink normally loaded into the cartridge. The second line show an ink jet ink with poor initial volume of ink that can be added, but the volume increases with subsequent refills. The third line shows ink jet inks that give acceptable volume of ink initially, but subsequent refills show a decreasing amount of ink can be added. The fourth line shows ink which has poor initial refill and poor refill on subsequent refills.

EXAMPLES

Inks were prepared by mixing the indicated ingredients together and filtering the resulting solution. Water was deionized unless otherwise stated. The dyes used were "ink jet grade" meaning that they were relatively pure and free of extraneous salts. Aerosol® OT is a surfactant from Cytec Industries. Byk 347 and Byk 348 are surfactants from Byk Chemie.

Color measurements were made with a commercially available spectrophotometer, Spectroeye from Gretag-MacBeth, or an X-Rite SP-62. Hue ($h_{ab}$) and chroma ($C^*_{ab}$) values were read directly from the instrument but were based on CIELAB color space L*, a* and b* terms according to the following equations: $h_{ab}=\tan^{-1}(b^*/a^*)$ where the angle was adjusted for the appropriate quadrant and $C^*_{ab}=(a^{*2}+b^{*2})^{1/2}$. The measurements and definitions are well known in the art, for example, as described in ASTM Standard E308 and *Principles of Color Technology*, Billmeyer and Saltzman, 3rd Ed., Roy Berns editor, John Wiley & Sons, Inc. (2000).

Reflectance values of the CMY composite black were measured at several wavelengths using a Gregtag densitometer. Dark and black images are associated with low reflectance values.

Example 1

Inks were prepared with the compositions shown in Table 1. Each ink was tested by loading into an empty Lexmark 83 ink jet cartridge four times in sequence. An empty Lexmark 83 ink jet trichamber color pen was put into a clip to block the nozzles. A needle was inserted into the foam of the yellow ink reservoir. This assembly was then connected to an ink supply tube in a vacuum chamber having a transparent viewing port. The chamber was evacuated to −25 psig. The test ink was allowed to fill the reservoir till a slight overflow was noted. The vacuum was released, and the weight of ink added was recorded. The ink was emptied out of the pen and the process was repeated three more times.

For the color measurements, the inks were loaded into Lexmark 35 pens and printed from a Lexmark Z-845 printer onto Hammermill Copy Plus office paper. The color of the 100 percent Yellow patch was read.

The refill amount should be at least 5.5 grams, preferably 6 grams for good refill. As can be seen in the Table 1 both the alkyne alcohol and trisiloxane surfactant are needed to give the optimum refill amounts, good jetting and good color.

TABLE 1

| Ink # | E1 | C1 | C2 | C3 |
|---|---|---|---|---|
| Material | | | | |
| DY-132 | 3.2 | 3.2 | 3.2 | 3.2 |
| 2-Pyrolidinone | 9 | 9 | 9 | 9 |
| Diacetone alcohol | 2 | 2 | 2 | 2 |
| Compound A5 | 0.7 | 0 | 0.7 | 0 |
| Compound S1 | 0.1 | 0 | 0 | 0.1 |
| Water | 85 | 85.8 | 85.1 | 85.7 |
| Surface tension | 23.2 | 56.1 | 38.7 | 22.5 |
| Refill amounts | | | | |
| First refill | 7.1 | 4.1 | 5.7 | 6.1 |
| Second refill | 7.18 | 5.75 | 5.8 | 6.9 |
| Third refill | 7.5 | 6.5 | 6.4 | 7.8 |
| Fourth refill | 7.8 | 7.35 | 6.6 | 8.1 |
| Jetting | Good | Poor | Good | Good |
| Color yield | 52 | 46 | 49 | 49 |
| | (Good) | (very low) | (low) | (low) |

A5 is Surfynol ® 61
S1 is Byk 347.

Jetting was judged by a visual rating of the printed area for streaks.

Color yield was the Chroma C* of a 100% Yellow area fill sample.

Example 2

Example inks were prepared as described in Example 1 with the ingredients and amounts shown in Table 2. This table shows that the levels of the alkyne alcohol and trisiloxane surfactant can be varied within reasonable ranges and the refill properties are still within the desired amounts.

TABLE 2

| Ink # | E2 | E3 | E4 | E5 |
|---|---|---|---|---|
| Material | | | | |
| DY-132 | 3.2 | 3.2 | 3.2 | 3.2 |
| 2-Pyrolidinone | 9 | 9 | 9 | 9 |
| Diacetone alcohol | 2 | 2 | 2 | 2 |
| Compound A5 | 0.3 | 0.3 | 1.5 | 1.5 |
| Compound S1 | 0.3 | 0.03 | 0.03 | 0.3 |
| Water | 85.2 | 85.47 | 84.27 | 84 |
| Surface tension | 21.5 | 21.9 | 25.8 | 25 |
| Refill amounts | | | | |
| First refill | 5.79 | 6.1 | 5.8 | 6.1 |
| Second refill | 6.0 | 6.7 | 7.1 | 6.5 |
| Third refill | 6.5 | 7.5 | 7.9 | 7.5 |
| Fourth refill | 6.9 | 8.5 | 8.5 | 7.6 |

A5 is Surfynol ® 61.
S1 is Byk 347.

Example 3

Inks were prepared as described in Example 1 using the ingredients shown in Table 3 below.

Ink C4 in Table 3 shows that refill is poor if an alkyne diol is used in place of the alkyne alcohol. Ink C6 shows the polydimethylsiloxane shows poor refill when used alone. The refill amount drops below 5.5 grams for ink C6.

The example ink E6 show the trisiloxane, Silwet® L-7550 can be used with the alkyne alcohol to give good refill results.

TABLE 3

| Ink # | C4 | C6 | E6 |
|---|---|---|---|
| Material | | | |
| DY-132 | 3.2 | 3.2 | 3.2 |
| 2-Pyrolidinone | 9 | 9 | 9 |
| Diacetone alcohol | 2 | 2 | 2 |
| Surfynol ® 61 | | | 0.7 |
| Byk-347 | 0.1 | | |
| Surfynol ® 440 | 0.7 | | |
| Byk 348 | | 0.1 | |
| Silwet ® L-7550 | | | 0.3 |
| Water | 85.0 | 85.7 | 84.8 |
| Surface Tension | 23.5 | 23.0 | 27.1 |
| Refill Amounts | | | |
| First refill | 6.27 | 5.5 | 6.8 |
| Second refill | 5.1 | 3 | 7.1 |
| Third refill | 3.8 | 2 | 7.5 |
| Fourth refill | 3.4 | 1.8 | 8.7 |

Surfynol ® 440 is an alkyne diol.
Byk 348 is a polydimethylsiloxane, ethylene oxide adduct.
Silwet ® L7550 is a trisiloxane.

Example 4

Comparative inks were prepared as shown in Table 4 from a variety of other classes of surfactants in combination with the alkyne alcohol. Inks C9, C11, C13, and C14 gave poor refill because the ink amount decreased with subsequent refills. Inks C10 and C12 were unacceptable because the first refill amount was too low. Ink C8 was unacceptable because the refill amount was generally low.

TABLE 4

| | Ink # | | | | | | |
|---|---|---|---|---|---|---|---|
| | C8 | C9 | C10 | C11 | C12 | C13 | C14 |
| Material | | | | | | | |
| DY-132 | 3.2 | 3.2 | 3.2 | 3.2 | 3.2 | 3.2 | 3.2 |
| 2-Pyrolidinone | 9 | 9 | 9 | 9 | 9 | 9 | 9 |
| Diacetone alcohol | 2 | 2 | 2 | 2 | 2 | 2 | 2 |
| Surfynol ® 61 | 0.7 | 0.7 | 0.7 | 0.7 | 0.7 | 0.7 | 0.7 |
| Tergitol ® 15-S-7 | 2.0 | | | | | | |
| Aerosol ® OT | | 0.2 | | | | | |
| Zonyl ® FSN | | | 0.1 | | | | |
| DePhos ® 8038 | | | | 0.2 | | | |
| Mackanate ® ELK | | | | | 0.2 | | |
| Mackam ® LMB | | | | | | 0.2 | |
| S-393 | | | | | | | 0.2 |
| Water | 83.1 | 84.9 | 85.0 | 84.9 | 84.9 | 84.9 | 84.9 |
| Surface Tension | 29.5 | 26.1 | 23.5 | 26.3 | 28.2 | 32.9 | 21.8 |
| Refill Amounts | | | | | | | |
| First refill | 4.05 | 5.10 | 4.01 | 5.3 | 4.1 | 4.9 | 4.8 |
| Second refill | 3.2 | 4.5 | 4.8 | 4.0 | 5.2 | 4.0 | 4.9 |
| Third refill | 3.8 | 4.1 | 5.2 | 4.1 | 5.5 | 3.75 | 4.8 |
| Fourth refill | 4.0 | 2.6 | 5.25 | 2.9 | 5.3 | 4.1 | 3.75 |

Tergitol ® 15-S-7 is an alcohol ethoxylate.
Aerosol ® OT is dioctyl sulfosuccinate, sodium salt.
Zonyl ® FSN is a fluorocarbon ethoxylate.
DePhos ® 8028 is an alkyl ethoxylate phosphate ester, potassium salt.
Mackanate ® ELK is disodium laureth sulfosuccinate.
Mackam ® LMB is a lauric/mysistic amidopropyl betaine.
S-393 is a sulfated polyethyleneoxide nonylphenol, sodium salt.

Example 5

Example inks, E7 through E14, were prepared as in Example 1 with the ingredients shown in Tables 5 and 6. These inks show that a wide range of alkyne alcohol structures are effective in the present disclosure. The alkyne can have a primary (E7, E8, and E9), secondary (E11 and E14), or tertiary (E10, E12, and E13) alcohol. The alkyne triple bond may be either internal (E7 through E10, and E13) or terminal (E11, E12, and E14). Molecular weight of the alkyne alcohols in the examples varied from 84 to 140.

TABLE 5

| Ink # | E7 | E8 | E9 | E10 |
|---|---|---|---|---|
| Material | | | | |
| DY-132 | 3.2 | 3.2 | 3.2 | 3.2 |
| 2-Pyrolidinone | 9 | 9 | 9 | 9 |
| Diacetone alcohol | 2 | 2 | 2 | 2 |
| Byk -347 | 0.1 | 0.1 | 0.1 | 0.1 |
| 3-nonyn-1-ol | 0.2 | | | |
| 3-octyn-1-ol | | 0.25 | | |
| 2-octyn-1-ol | | | 0.2 | |
| 2-methyl-3-hexyn-2-ol | | | | 1.0 |
| Water | 85.5 | 85.45 | 84.5 | 84.7 |
| Surface Tension | 23.1 | 21.8 | 22.3 | 21.7 |
| Refill Amounts | | | | |
| First refill | 5.5 | 5.7 | 5.6 | 7.1 |
| Second refill | 6.2 | 6.25 | 7 | 7.57 |
| Third refill | 6.75 | 6.92 | 7.15 | 7.6 |
| Fourth refill | 7.05 | 7.4 | 6.89 | 7.4 |

TABLE 6

| Ink # | E11 | E12 | E13 | E14 |
|---|---|---|---|---|
| Material | | | | |
| DY-132 | 3.2 | 3.2 | 3.2 | 3.2 |
| 2-Pyrolidinone | 9 | 9 | 9 | 9 |
| Diacetone alcohol | 2 | 2 | 2 | 2 |
| Byk -347 | 0.1 | 0.1 | 0.1 | 0.1 |
| 5-methyl-1-hexyn-3-ol | 1.0 | | | |
| 3-methyl-1-pentyn-3-ol | | 5.0 | | |
| 2-methyl-3-butyn-2-ol | | | 5.0 | |
| 1-pentyn-3-ol | | | | 5.0 |
| Water | 84.7 | 80.7 | 80.7 | 80.7 |
| Surface Tension | 22.7 | 23.2 | 21.7 | 23.4 |
| Refill Amounts | | | | |
| First refill | 5.25 | 5.28 | 5.7 | 5.8 |
| Second refill | 6.8 | 5.8 | 6.7 | 7.0 |
| Third refill | 6.9 | 6.9 | 7 | 7.3 |
| Fourth refill | 6.9 | 7.4 | 7.3 | 7.6 |

Each ink was tested by loading into an empty Lexmark 83 ink jet cartridge four times in sequence. An empty Lexmark 83 ink jet trichamber color pen was put into a clip to block the nozzles. A needle was inserted into the foam of the yellow ink reservoir. This assembly was then connected to an ink supply tube in a vacuum chamber having a transparent viewing port. The chamber was evacuated to −25 psig. The test ink was allowed to fill the reservoir till a slight overflow was noted. The vacuum was released, and the weight of ink added was recorded. The ink was emptied out of the pen and the process was repeated three more times.

Example 6

Ink Set

An ink set was formulated as shown in Table 7 wherein materials are listed in percents.

TABLE 7

| Material | Cyan 1 | Magenta 1 | Yellow 1 |
|---|---|---|---|
| 2-Pyrrolidinone | 7 | 7 | 7 |
| Diacetone alcohol | 2 | 2 | 2 |
| 1,2-Hexanediol | 2 | 2 | 2 |
| Trimethylolpropane | 3 | 3 | 0 |
| Sodium nitrate | 0 | 3 | 0 |
| 2-Methyl-3-hexyn-2-ol | 1 | 1 | 1 |
| Byk-347 | 0.1 | 0.1 | 0.1 |
| C.I. Direct Blue 199 | 3.6 | 0 | 0 |
| C.I. Acid Red 249 | 0 | 2.8 | 0 |
| C.I. Acid Red 52 | 0 | 0.5 | 0 |
| C.I. Direct Yellow 132 | 0 | 0 | 3.2 |
| Water | Balance | Balance | Balance |
| PH | 8.0 | 7.9 | 8.0 |
| Surface tension | 22.4 | 24.6 | 22.6 |

These Cyan, Magenta, and Yellow inks were loaded into an empty Lexmark 35 ink jet cartridge. The pen was used in a Lexmark Z845 printer to image 100 percent coverage blocks of Cyan, Magenta, Yellow, Black, Red, Green, and Blue.

TABLE 8

Color values on a variety of media:

| Media | Cyan C* | Magenta C* | Yellow C* | Black L* | Red C* | Green C* | Blue C* |
|---|---|---|---|---|---|---|---|
| HCP | 42.8 | 51.7 | 47.2 | X | 41.8 | 46.3 | 39.9 |
| X-4200 | 41.9 | 51.5 | 46.3 | X | 41.1 | 46.7 | 39.3 |
| HP-BW | 44.2 | 55.5 | 48.8 | X | 46.5 | 49.0 | 42.1 |
| Kodak UP | 43.1 | 68.3 | 70.2 | 26.9 | 63.9 | 63.5 | 52.2 |
| OD-PPP | 48.5 | 75.2 | 80.5 | 17.6 | 78.8 | 80.1 | 57.3 |
| Staples PSP | 45.0 | 74.0 | 80.7 | 21.0 | 76.0 | 76.7 | 56.4 |
| HP-Advanced | 43.3 | 73.0 | 76.8 | 22.5 | 75.5 | 76.7 | 55.3 |
| HP-PPP | 42.1 | 64.6 | 70.9 | 25.8 | 64.5 | 62.3 | 44.4 |

X - The Black on office papers is from the Black ink. On the photo media, the Black is a tricolor Black formed from printing the Cyan, Magenta, and Yellow inks.

HCP is International Paper Hammermill Copy Plus, 75 g/M$^2$, 84 brightness.
X-4200 is Xerox Business 4200, 75 g/M$^2$, 92 brightness.
HP-BW is HP Bright White Inkjet Paper ColorLok, 90 g/M$^2$, 97 brightness.
Kodak UP is Kodak Ultra Premium Photo Paper-high gloss, 10.5 mil, cat 170 444, 285 g/M$^2$.
OD-PPP is Office Depot Professional Photo Paper-Brilliant Gloss, 10.25 mil, 151-616, 265 g/M$^2$.
Staples-PSP is Staples Photo Supreme-High Gloss, Item # 518923, 270 g/M$^2$.
HP-Advanced is HP-Advanced Photo Paper-Glossy, 10.5 mil, Q7854A, 250 g/M$^2$.
HP-PPP is HP Premium Plus Photo Paper-High Gloss, 11.5 mil, Q1785A, 280 g/M$^2$.

The results shown in Table 8 demonstrate that the ink and ink set of this disclosure have good color on both plain paper and specialty paper, and swellable polymer and microporous photo glossy papers.

Example 7

An ink set was formulated as shown in Table 9 wherein materials are listed in percents.

TABLE 9

| Material | Cyan 2 | Magenta 2 | Yellow 2 |
|---|---|---|---|
| 2-Pyrrolidinone | 7 | 7 | 7 |
| Diacetone alcohol | 2 | 2 | 2 |
| 1,2-Hexanediol | 2 | 2 | 2 |
| Trimethylolpropane | 3 | 3 | 0 |
| Sodium nitrate | 0 | 3 | 0 |
| Surfynol 61 | 0 | 0 | 0.7 |
| Byk-347 | 0.1 | 0.1 | 0.1 |
| C.I. Direct Blue 199 | 3.3 | 0 | 0 |
| C.I. Acid Red 249 | 0 | 2.8 | 0 |
| C.I. Acid Red 52 | 0 | 0.5 | 0 |

TABLE 9-continued

| Material | Cyan 2 | Magenta 2 | Yellow 2 |
|---|---|---|---|
| C.I. Direct Yellow 132 | 0 | 0 | 3.3 |
| Water | Balance | Balance | Balance |
| PH | 7.45 | 8.3 | 7.4 |
| Surface tension | 21.7 | 23.1 | 23.7 |
| Viscosity | 1.7 | 1.7 | 1.6 |

These Cyan, Magenta, and Yellow inks were loaded into an empty Lexmark 35 ink jet cartridge. The pen was used in a Lexmark Z845 printer to image 100 percent coverage blocks of Cyan, Magenta, Yellow, Black, Red, Green, and Blue.

TABLE 10

Color values for Cyan 2, Magenta 2, and Yellow 2 on a variety of media

| Media | Cyan C* | Magenta C* | Yellow C* | Black L* | Red C* | Green C* | Blue C* |
|---|---|---|---|---|---|---|---|
| HCP | 39.8 | 51.7 | 45.2 | X | 45.5 | 44.2 | 38.5 |
| X-4200 | 38.0 | 50.1 | 43.5 | X | 44.1 | 43.1 | 37.3 |
| HP-BW | 39.5 | 53.0 | 45.8 | X | 47.4 | 44.0 | 38.2 |
| Kodak UP | 44.0 | 68.4 | 65.7 | 26.2 | 66.1 | 60.0 | 47.9 |
| OD-PPP | 46.0 | 75.8 | 80.4 | 16.9 | 78.4 | 76.3 | 54.2 |
| Staples PSP | 49.5 | 74.1 | 79.6 | 22.0 | 77.1 | 73.4 | 55.2 |
| HP-Advanced | 47.1 | 73.5 | 73.1 | 21.5 | 76.4 | 74.8 | 56.1 |
| HP-PPP | 45.7 | 65.7 | 70.7 | 25.7 | 66.9 | 60.4 | 46.6 |
| Lex PPP | 43.7 | 62.5 | 66.4 | 25.6 | 63.9 | 53.9 | 46.4 |

X - The Black on office papers is from the Black ink. On the photo media, the Black is a tricolor Black formed from printing the Cyan, Magenta, and Yellow inks.
Lex PPP is Lexmark Premium Photo Paper.

The data in Table 10 show that the surfactant combination of this disclosure can be used in just one ink in an ink set to provide good color across a set of diverse media.

The invention claimed is:

1. An ink jet ink comprising a dye, an aqueous vehicle, and a surfactant combination comprising:
   (a) an acetylene alcohol comprising at least one compound having the generic structure:

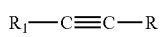

wherein R and $R_1$ are C1-C10 linear or branched alkyl groups or hydrogen, and wherein only one hydrogen on either R or $R_1$ is replaced by a hydroxy group; and
   (b) a siloxane surfactant comprising at least one compound having the generalized structure

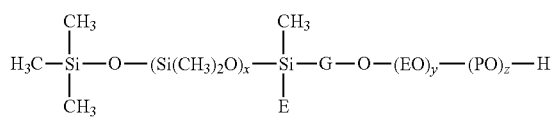

wherein E is —$CH_3$ or —O—$Si(CH_3)_3$, provided that E is —$CH_3$ when x is greater than 0; EO is ethylene oxide, PO is propylene oxide,
   G=-$CH_2$—, or —$CH_2$—$CH_2$—$CH_2$—,
   x, y, and z are independently about 0 to about 40; and
   wherein the acetylene alcohol is present in the amount of at least about 0.3%, and the siloxane surfactant is present in the amount of at least about 0.03 to about 0.5 percent, based on the weight of the ink composition.

2. The ink jet ink of claim 1 wherein x, y, and z are independently about 0 to about 20.

3. The ink jet ink of claim 1 wherein x, y, and z are independently about 1 to about 10.

4. The ink jet ink of claim 1 wherein x, y, and z are independently about 3 to about 8.

5. The ink jet ink of claim 1 wherein the linear alkyl group is selected from the group consisting of methyl, ethyl, propyl, butyl, pentyl, hexyl, heptyl, octyl, and nonyl.

6. The ink jet ink of claim 1 wherein the branched alkyl group is selected from the group consisting of isopropyl, isobutyl, isopentyl, and other branched structures such that the total molecular weight does not exceed about 182.

7. The ink jet ink of claim 6 wherein the acetylene alcohol has a molecular weight of about 56 to about 182.

8. The ink jet ink of claim 1 wherein the acetylene alcohol has a molecular weight of about 84 to about 140.

9. The ink jet ink of claim 1 wherein the acetylene alcohol has the following structure:

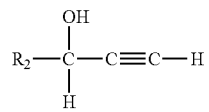

wherein $R_2$ is $C_2$ to $C_9$ linear or branched alkyl.

10. The ink jet ink of claim 1 wherein the acetylene alcohol has the following structure:

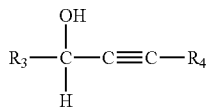

wherein $R_3$ and $R_4$ are linear or branched alkyl with 2 to 9 total carbons.

11. The ink jet ink of claim 1 wherein the acetylene alcohol has the following structure:

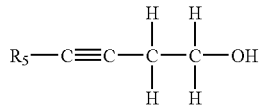

wherein $R_5$ is $C_1$ to $C_8$ linear or branched alkyl.

12. The ink jet ink of claim 1 wherein the acetylene alcohol has the following structure:

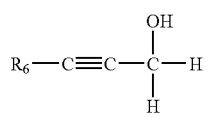

wherein $R_6$ is a linear or branched alkyl containing a total of 2 to 9 carbons.

13. The ink jet ink of claim 1 wherein the acetylene alcohol is selected from the group consisting of 3,4-diethyl-1-hexyn-3-ol, 3-nonyl-1-ol, 3,5,5-trimethyl-1-hexyn-3-ol, 3,4,4-trimethyl-1-hexyn-3-ol, 3,5-dimethyl-2-heptyn-4-ol, 4,6-dimethyl-2-heptyn-4-ol, 1-octyn-3-ol, 3-octyn-1-ol, 2-octyn-1-ol, 3-ethyl-1-hexyn-3-ol, 3,4-dimethyl-1-hexyn-3-ol, 3methyl-4-heptyn-3-ol, 2-methyl-3-hexyn-2-ol, 5-methyl-1-hexyn-3-ol,] 3-methyl-1-pentyn-3-ol, 2-methyl-3-pentyn-2-ol, 2-methyl-3-butyn-2-ol, 2-pentyn-1-ol, and 1-pentyn-3-ol.

14. The ink jet ink of claim 1 wherein the acetylene alcohol is present in the amount of at least about 0.3 to about 1.5%.

15. The ink jet ink of claim 1 wherein the siloxane surfactants is Ethanol, 2-[[1,3,3,3-tetramethyl-1-[(trimethylsilyl)oxy]disiloxanyl]methoxy]-ethanol and ethoxylated derivatives thereof with a molecular weight of about 500 having the structure:

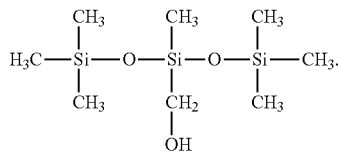

16. The ink jet ink of claim 1 wherein the siloxane surfactants is [3-[1,3,3,3-tetramethyl-1-[(trimethylsilyl)oxy]-1disiloxanyl]propyl] ether and polyethers with propylene glycol to give a molecular weight of about 400 having the structure:

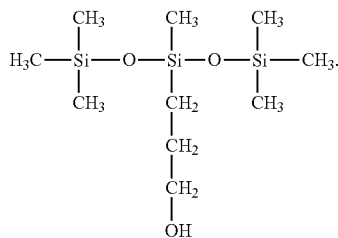

17. The ink jet ink of claim 1 wherein the siloxane surfactants is

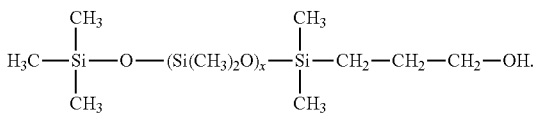

18. The ink jet ink of claim 17 wherein the siloxane surfactant further comprises polyethers with ethylene glycol wherein x and the amount of ethylene glycol may be adjusted to give a molecular weight of about 1,700 to about 2,000.

19. The ink jet ink of claim 17 wherein the siloxane surfactant further comprises polyethers with propylene oxide and x adjusted to give a molecular weight of about 2,800.

20. The ink jet ink of claim 1 wherein the siloxane surfactant is present in the amount of at least about 0.05 to about 0.3 percent, based on the weight of the ink composition.

21. The ink jet ink of claim 1 wherein the vehicle comprises water or a mixture of water and at least one water-soluble organic solvent (co-solvent) or humectant.

22. The ink jet ink of claim 1 wherein the dye is selected from the group consisting of acid, direct, reactive and food dyes.

23. The ink jet ink of claim 1 further comprising a metal salt.

24. The ink jet ink of claim 1 wherein the dye is present in the amount of about 0.1 wt % to about 10 wt %.

25. An ink set wherein at least one ink in the ink set comprises a dye, an aqueous vehicle, and a surfactant combination comprising:
(a) an acetylene alcohol comprising at least one compound having the generic structure:

wherein R and $R_1$ are C1-C10 linear or branched alkyl groups or hydrogen, and wherein only one hydrogen on either R or $R_1$ is replaced by a hydroxy group; and
(b) a siloxane surfactant comprising at least one compound having the generalized structure

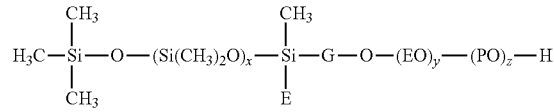

wherein E is —$CH_3$ or —O—$Si(CH_3)_3$, provided that E is —$CH_3$ when x is greater than 0; EO is ethylene oxide, PO is propylene oxide,
G=-$CH_2$—, or —$CH_2$—$CH_2$—$CH_2$—,
x, y, and z are independently about 0 to about 40, ; and
wherein the acetylene alcohol is present in the amount of at least about 0.3%, and the siloxane surfactant is present in the amount of at least about 0.03 to about 0.5 percent, based on the weight of the ink composition.

* * * * *